Sept. 23, 1969 G. A. DUNCAN ET AL 3,468,546

SEQUENTIAL PLAY PHONOGRAPH

Filed Dec. 20, 1966 3 Sheets-Sheet 1

INVENTORS
GOLDA A. DUNCAN
ROBERT N. ALESON
BY
Mason & Graham
ATTORNEYS

FIG. 5
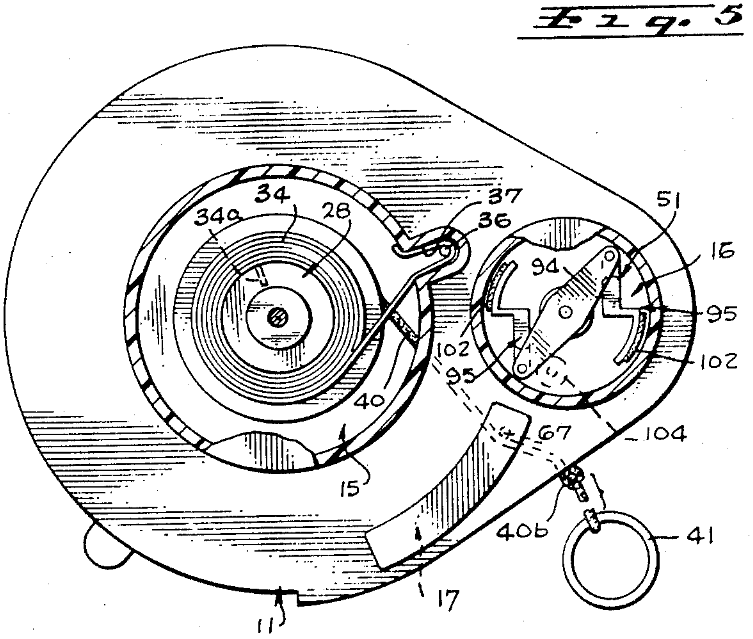
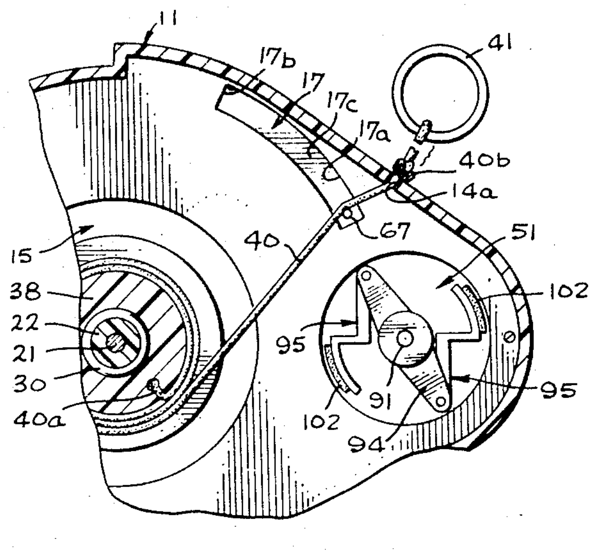
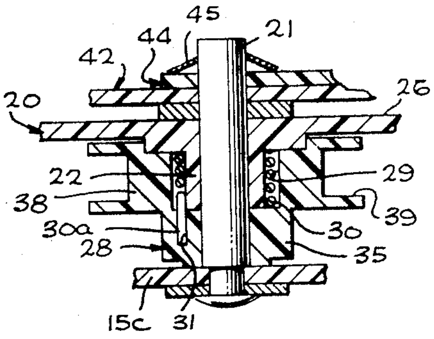
FIG. 6 FIG. 4
GOLDA A. DUNCAN
ROBERT N. ALESON
INVENTORS
BY
Mason & Graham
ATTORNEYS

SEQUENTIAL PLAY PHONOGRAPH

Filed Dec. 20, 1966

GOLDA A. DUNCAN
ROBERT N. ALESON
INVENTORS

BY Mason & Graham
ATTORNEYS 3,468,546

SEQUENTIAL PLAY PHONOGRAPH

Golda A. Duncan, North Hollywood, and Robert N. Aleson, Sylmar, Calif., assignors, by direct and mesne assignments, to Lorraine Industries, Inc., Bridgeport, Conn.

Filed Dec. 20, 1966, Ser. No. 603,244
Int. Cl. G11b *1/00, 3/70, 3/60*
U.S. Cl. 274—9 4 Claims

ABSTRACT OF THE DISCLOSURE

A sequential play phonograph with improved setting means including an arcuate segment concentric with the record and having means engaging a control disk to rotate the disk a predetermined distance during each operating cycle of the phonograph. The disk has windows at locations corresponding to specific passages on the record to allow a reproduction needle to engage the passages. The record is driven by a spring motor which is wound by a pull-cord that also engages the arcuate segment to assist in positioning the control disk. The arcuate segment is held in contact with the control disk by a member that engages the segment near the arcuate edge thereof to equalize the forces on the segment.

This invention has to do generally with miniature phonograph devices and particularly with devices of the type disclosed in the copending application of Golda A. Duncan, for Phonograph Device, Ser. No. 530,588, filed February 28, 1966, now Patent No. 3,371,934.

In the device disclosed in the application referred to, a play control disk superposed with relation to a record disk and provided with a series of windows or openings, each of which exposes a predetermined portion of the record, is used as part of the means for controlling the playing of selections or certain portions of the record sequentially in a predetermined order, the needle extending through an opening in the play control disk to effect reproduction. In such a device means is provided for advancing the control disk to move the needle from one opening or window to the next at the conclusion (or at the beginning) of each cycle of play.

An object of the present invention is to provide a novel and improved device having several advantageous features of construction over the phonograph of the above-referred-to pending patent application.

Another object is to provide means to enable the record drive spring to be wound by a pullstring or the like without having the record rotate reversely during the winding process.

A further object is to provide a phonograph device of the type indicated which has a longer record life than that of the previously referred to device and which is so constructed as to have an over-all lower noise level during reproduction.

A still further object of the invention is to provide a novel construction which eliminates the necessity of having a detent or indexing means for releasably engaging the play control disk each time it is advanced, thereby enabling the phonograph to be made smaller, lighter and with fewer parts.

Another object is to provide a novel and improved governor means including a governor having relatively light parts of novel construction which results in a more efficient and rapid starting of the record and which has improved governing ability, enabling the record to be operated at a lower rate of speed without loss of fidelity and thereby also increasing the playing time of the record.

Still another object is to provide a construction which lends itself to adjusting the speed of the record disk by a simple operation that can be performed in the manufacture of the governor.

A further object is to provide a novel and improved case shaped to receive and cooperate with certain of the working elements of the invention.

More particularly it is an object to provide a cover plate for the governor which incorporates a bearing for the governor shaft and which provides a base for mounting the tone arm of the device.

These and other objects will be apparent from the drawings and the following description. Referring to the drawings:

FIG. 4 is a fragmentary sectional detail view in the plane of FIG. 3 of the record spindle and adjacent parts, but on a larger scale;

FIG. 5 is an inverted plan view of the device of FIG. 1, with portions of the casing broken away;

FIG. 6 is a fragmentary sectional view on line 6—6 of FIG. 3;

Figure 1:
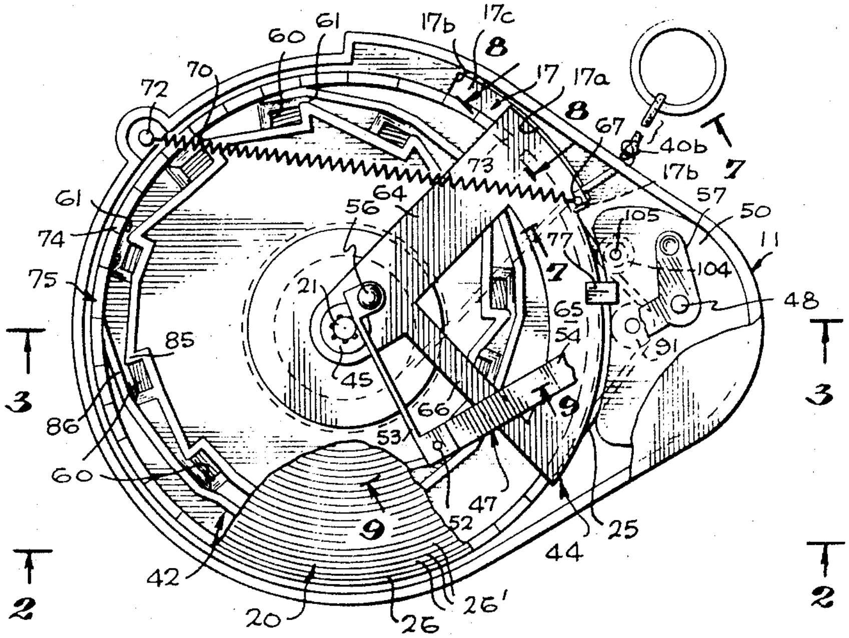
FIG. 1 is a plan view of a phonograph device embodying the invention with the diaphragm or upper wall of the case substantially broken away and with a portion of the control disk broken away.
Figure 2:
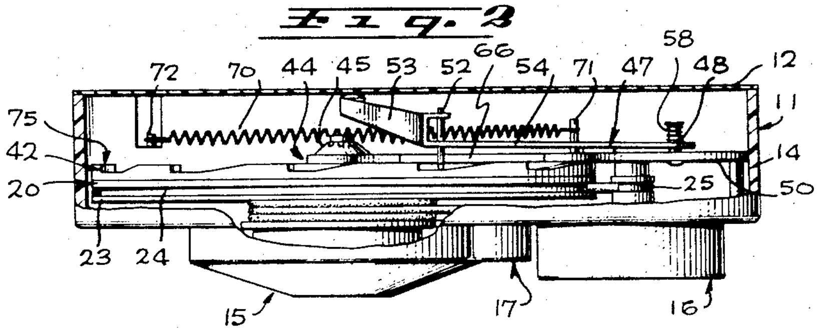
FIG. 2 is a side elevational view as from the direction of line 2—2 of FIG. 1, with the near side wall partially broken away.
Figure 3:
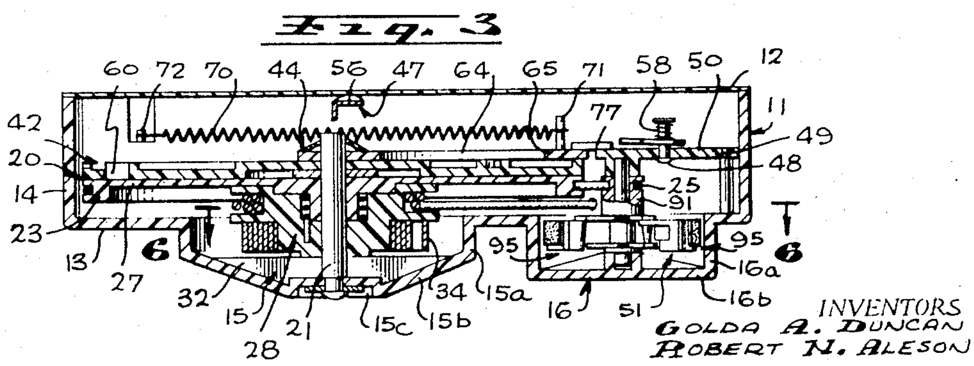
FIG. 3 is a sectional view on line 3—3 of FIG. 1.
Figure 7:
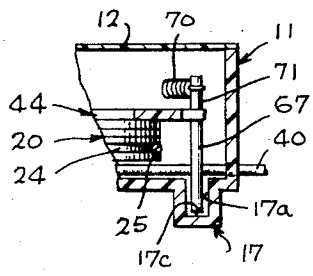
FIG. 7 is a fragmentary sectional view on line 7—7 of FIG. 1.
Figure 8:
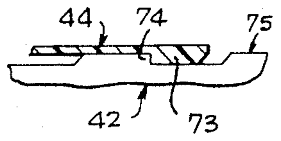
FIG. 8 is a fragmentary sectional view on line 8—8 of FIG. 1.

More particularly describing the invention, numeral 11 generally designates a case which houses the moving parts of the phonograph except for the sound diaphragm which also serves as the upper wall 12 of the case. The diaphragm may be of paper or plastic while the remainder of the case is preferably molded of plastic. The case has a bottom wall 13 and a continuous peripheral or side wall 14 to which the top wall is cemented. The bottom wall is generally flat and in one plane except where it is interrupted by three wells, designated 15, 16 and 17. The first of these is the largest, is generally circular with a cylindrical wall 15*a*, a conoidal bottom wall 15*b*, and a recessed bottom wall 15*c*. Well 16 is somewhat smaller and is circular, being defined by a cylindrical wall 16*a* and a bottom wall 16*b*. Well 17 is elongated, narrow and concentric with well 15, having side walls 17*a*, end walls 17*b* and a bottom wall 17*c*.

A phonograph record member 20 which serves as a combined turntable and record, is rotatably supported on a shaft or spindle 21 secured centrally of the well 15 in the bottom wall 15*c* thereof. Member 20 has a central boss 22 and a rim 23 with a peripheral groove 24 to receive a belt 25 that is part of the speed governing means. The upper surface 26 of the disk-like body 27 of the member is formed with a spiral sound groove 26′ containing suitable recorded selections to be reproduced. Below the record member is an arbor 28 which rotatably receives the spindle. The arbor has a counterbore 29 receiving the boss of the record member and defining therewith an annular space in which a helical coil clutch spring 30 is positioned. The lower end 30*a* of the spring is fixed to the arbor, being received in a bore 31. The arbor is supported on cross webs 32 in the well. It is adapted to be driven by a clock spring 34 coiled around the lower section 35, one end 34*a* of the spring being secured to the arbor and the other end 34*b* being hooked around a projection 36 of the case in a recess 37 at one side of the well 15 of the case. The upper section 38 of the arbor is formed similar to a pulley or sheave with a wide peripheral recess 39 to contain pull string 40 which is wound therearound. The inner end 40*a* of the string is anchored to the arbor while the outer end is tied to a pull ring 41 outside the case, the string passing through a hole 14*a* in the side wall of the case. The orientation of the string winding, the clock spring and the clutch coil is such that, when the string is pulled the arbor 28 is rotated counterclockwise (as viewed in FIG. 1) winding the spring 34 but tending to unwind or loosen the coil clutch spring 30 so that the record member is not rotated. When the pull string is released, spring 34 rotates the arbor and hence the coil clutch spring which engages and drives the record with the arbor as a unit.

Although the pull ring 41 may be used to limit movement of the string 40 inwardly of the case, since the phonograph device is designed to be embodied in various types of toys where it may be some distance from the outer surface of the toy, we prefer to knot the string outside the case and use the knot, designated 40*b*, as the stop or means limiting inward movement of the string. The string can then be made as long as desired beyond the knot.

A play control disk 42 is rotatably mounted on the spindle 21 and pivotally mounted thereabove is a reset lever 44, the assembly being retained by a spring lock fastener 45.

The sound reproducing means includes a tone arm 47 which is pivotally mounted on a rivet 48 that is received in a hole 49 in a deck 50 that partially covers the well 16 and a governor 51 which will be described later. The tone arm is generally L-shaped in plan and has a stylus or needle 52 at the junction of the two legs 53 and 54. The needle traverses the record groove through one of several openings or windows 60 in disk 42. The free end of the tone arm has a dimpled end 56 which engages and drives the diaphragm, gliding across its undersurface. The leg 53 is torsionally stressed by reason of the fact that were the tone arm not confined by the diaphragm 12, the end 56 would be above the plane of the diaphragm. The leg 54 has a laterally projecting dimpled foot 57 which rides on the deck 50 and resists the torsional stress along with a spring 58 on rivet 48.

As in the copending application of Golda A. Duncan, previously referred to, it is a particular feature of the invention that the play control disk 42 is utilized to provide for the reproduction of predetermined portions of the record sound groove in a predetermined sequence. The record itself is recorded in accordance with a predetermined pattern so that desired selections are provided on the given predetermined portions of the record. Normally the play control disk is stationary and the needle 52 extends through one of the windows 60 in the disk. As in the device of said copending application, there are a plurality of windows 60 which are spaced circumferentially and are at different radial distances from the axis of rotation. These windows are connected in sequence by tracking means in the form of channels 61 in the outer surface of the disk. During the playing of a selection the needle 52 is received in one of the windows and projects therethrough to engage and reproduce the sound on the record. As the record rotates, each window of the play control disk exposes a predetermined area of the record surface different from that of any other window, although, if desired, certain windows could be made to expose the same portions of the record as others. It will be apparent, therefore, that the portion of the record played is determined by the position of the play control disk, since the needle must extend through one of the openings in the disk in order to engage the record and travel in the record groove.

The reset lever 44 functions to advance the play control disk. The lever may be variously shaped, however, it is shown as having a main radial arm 64, an arcuate segment 65 concentric about the spindle 21, and a connecting arm 66. The lever has a depending post 67 that is freely received in the well 17 and behind which the pull string 40 is trained. A tension coil spring 70 connected between an upright post 71 on lever 44 and the case at 72 serves as a return means. The undersurface of the reset lever is provided with a ratchet tooth 73 for engagement with the teeth 74 of a circular ratchet track 75 on the upper surface of the disk 42. A tab 77 overlies the peripheral margin of the reset lever and holds it down.

It will be apparent that the "at rest" or "normal" position of the reset lever 44, when the device is not in use, depends upon such factors as the length (effective) of pull string 40 in relation to the length, size, strength and number of coils of clock spring 34 and the strength of return spring 70. We prefer to adjust or so proportion these factors that, at the end of the playing cycle the pull string 40 is pulled taut by spring 34 with knot 40*b* against the case with sufficient force to move the reset lever from retracted position to the position it occupies in FIG. 1 thereby advancing the control disk so that the needle enters the next window therein.

Assuming then, that the parts are in the position of FIG. 1, when the pull string 40 is pulled out to its full length, the reset lever remains in the position of FIG. 1. When the string is released, the pressure thereof against the depending post 67 of reset lever 44 is released and the return spring 70 rotates the lever counterclockwise approximately 30° where the ratchet tooth on the underside of the lever engages a ratchet tooth of the disk. During return of the pull string, the record rotates as previously explained. When the playing cycle is completed the pull string is placed under tension by the pull of spring 34 and the knot 40*b* is drawn against the case with sufficient force to tighten the string against the post 67 of the reset lever and draw the lever around to (or substantially to) the position of FIG. 1. This action of the reset lever, due to the interengagement of the ratchet teeth 73, 74, advances the disk about 30°. As the disk advances the needle is engaged by the advancing inclined rear edge portion 80 of the window 60 and lifted, causing it to traverse the adjacent channel 61 to the next window.

Figure 9:
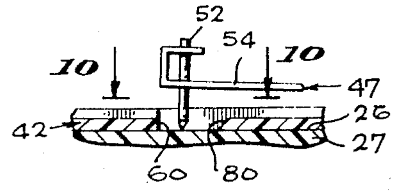
FIG. 9 is a fragmentary sectional view on line 9—9 of FIG. 1.
Figure 10:
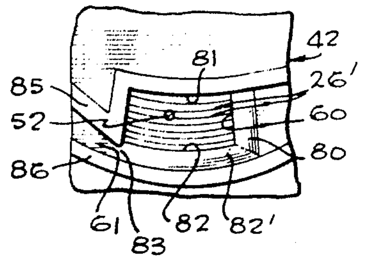
FIG. 10 is a fragmentary sectional view on line 10—10 of FIG. 9, but on a larger scale.
Figure 11:
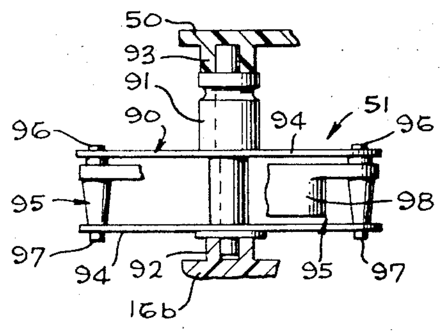
FIG. 11 is a fragmentary sectional view through the governor rotor, but on a larger scale.
Figure 12:
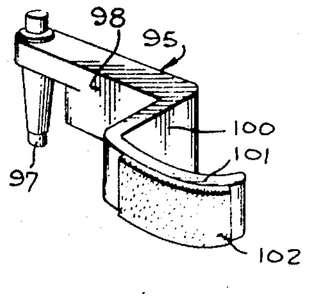
FIG. 12 is an isometric view of a governor flyweight, shown enlarged.

Referring now to FIGS. 9 and 10, it should be noted that the windows 60 appear to be generally rectangular, however, the inner and outer edges 81 and 82 are preferably formed to be arcuate about the center of the disk. The channels 61 are relatively wide at the rear edge of each window and then become increasingly narrow to terminate in a very narrow section 83 immediately ahead of the outer edge of the next window. The wall defining the outer edge of the window is downwardly and inwardly inclined at 82' so that the needle will descend along this surface and enter the first groove exposed in the window. The channels 61 are formed by a guide wall means on the disk comprising an inner wall 85 and an outer wall 86 which serve to border the windows 60 and channels 61 and thereby insure against the needle escaping from its intended path from window to window when the control disk is advanced.

When the record is being driven by the spring 34 an improved governor 51 serves to control its speed. This governor comprises a rotor 90 fixed to a shaft 91 that is journaled at its ends in bearings 92 and 93 located in the bottom wall 16*b* of well 16 and in the deck 50 over the well, respectively. The rotor includes two laterally spaced elongated diamond-shaped plates 94 and a pair of fly weights 95. Each fly weight is pivotally mounted at its inner end between the outer ends of the plates at 96, the fly weight having trunnions 97 for this purpose. The fly weight has a main body 98 which is received between the plates, a lateral leg 100 and an outer end section 101 which is arcuate and preferably provided on its outer surface with a covering of felt 102 or other suitable material. When the governor is driven, the fly weights swing out and run against the wall 16*a* of the well 16, the outer end sections being curved on about the same radius as the wall 16*a*.

As previously indicated, the record member has a peripheral groove 24 which receives the belt 25 which is trained around a pulley or sheave formed as part of the rotor shaft 91 of the governor. An idler pulley 104, mounted at 105 on the deck 50, serves to increase the amount of surface area of the rotor pulley which is engaged by the belt and prevents slippage. The governor is extremely light, yet efficiently governs the speed of the record. In mass production, slight changes in the setting of the machine tool for forming the shaft 91 can be made to vary the diameter of the pulley and thereby compensate for any adjustment required for production.

Although we have shown and described preferred forms of our invention, we contemplate that various changes and modifications can be made therein without departing from the invention.

We claim:

1. A phonograph device comprising: a casing; a phonograph record disk; means on one wall of said casing to support said disk for rotation; a control disk juxtaposed with respect to said record disk and co-axial therewith, said control disk comprising a plurality of windows at spaced positions and guide means defining a closed path encompassing said windows; reproducing means comprising a diaphragm substantially parallel to said record disk and spaced therefrom, a tone arm bearing against said diaphragm, and a needle attached to said tone arm and guided by said guide means to engage said record disk through said windows in sequence as said control disk is rotated from one predetermined angular position to another; reset means comprising a reset lever having engagement means engaging said control disk, said lever being pivoted co-axially with respect to said record disk and comprising an arcuate segment having an edge concentric with the axis about which said lever is pivoted, said reset means further comprising a pull-cord and means on said reset lever to engage said cord; an arbor concentric with said record disk; clutch means connecting said arbor to said record disk to permit relative rotation between said arbor and said record disk in one direction and to drive said record disk from said arbor in the opposite direction, said pull-cord being attached to said arbor to be wound thereon; and a drive spring connected to said arbor and to said casing to be wound when said pull-cord moves in one direction and to unwind and drive said record disk when said pull-cord moves in the opposite direction.

2. The phonograph device of claim 1 comprising, in addition: a member attached to said casing and extending over said arcuate segment to hold said engagement means on said reset lever in engagement with said control disk.

3. The phonograph device of claim 1 in which said control disk has a rim extending axially away from said record disk and having notches therein, said engagement means on said reset lever comprising a projection on the surface of said lever facing said notches to engage therein.

4. The phonograph device of claim 2 and which said member attached to said casing is angularly displaced from said projection on said reset lever to permit said projection to move out of one of said notches and into an adjacent notch to rotate said control disk.

References Cited

UNITED STATES PATENTS

| | | | |
|---|---|---|---|
| 3,082,006 | 3/1963 | Ryan | 274—1.1 |
| 3,282,588 | 11/1966 | Ashmele | 274—1.1 |
| 3,371,934 | 3/1968 | Duncan | 274—1 |

HARRY N. HAROIAN, Primary Examiner

U.S. Cl. X.R.

274—1, 13